US006761449B1

(12) United States Patent
Xie

(10) Patent No.: US 6,761,449 B1
(45) Date of Patent: Jul. 13, 2004

(54) SPECTACLES SET WITH DETACHABLE MAGNETIC SHELTER FRAME

(76) Inventor: Yiling Xie, 1009 Arcadia Ave., Suite 3, Arcadia, CA (US) 91007

( * ) Notice: Subject to any disclaimer, the term of this patent is extended or adjusted under 35 U.S.C. 154(b) by 0 days.

(21) Appl. No.: 10/420,446

(22) Filed: Apr. 22, 2003

(51) Int. Cl.[7] .................................................. G02C 7/08
(52) U.S. Cl. ......................................... 351/57; 351/47
(58) Field of Search ..................................... 351/47, 57

(56) References Cited

U.S. PATENT DOCUMENTS

| 6,382,787 B1 | * | 5/2002 | Xie | ............................. | 351/47 |
| 6,505,932 B2 | * | 1/2003 | Xiao | ........................... | 351/57 |
| 6,540,348 B1 | * | 4/2003 | Xie | ............................. | 351/57 |

* cited by examiner

Primary Examiner—Huy Mai
(74) Attorney, Agent, or Firm—Raymond Y. Chan; David and Raymond Patent Group

(57) ABSTRACT

A spectacles set includes a primary spectacle frame and a detachable shelter frame constructed for mounting in front of the primary spectacle frame. The primary spectacle frame includes a frame body which includes a pair of lenses, two nose support units rearwardly extended from the frame body, and two magnetic holders provided at the two nose support units respectively. The detachable shelter frame includes a shelter frame for supporting two auxiliary lenses and two magnetic attaching arrangements each of which includes a supporting arm extending rearwardly from an inner side of the auxiliary lens of the shelter frame towards the respective magnetic holder and a magnetic seat which is connected to the supporting arm and extended to magnetically attach the respective magnetic holder of the primary spectacle frame so as to hold the shelter frame in front of the primary spectacle frame in position.

28 Claims, 7 Drawing Sheets

SPECTACLES SET WITH DETACHABLE MAGNETIC SHELTER FRAME

BACKGROUND OF THE PRESENT INVENTION

1. Field of Invention

The present invention relates to spectacle frame, and more particularly to a spectacles set, which comprises a detachable shelter frame adapted for mounting on a primary spectacle frame by means of magnetic attraction.

2. Description of Related Arts

Shelter frames are widely used today. A conventional shelter frame, such as clip-on sunglasses, comprises a plurality of clipping claws for detachably mounted on a shortsighted or farsighted sunglasses so that the wearer does not need to carry and pay for another pair of shortsighted or farsighted sunglasses. However, the metal made clipping claws may scratch the lenses of the primary eyeglasses during the attaching operation. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problem of the above mentioned clip-on sunglasses, magnetic attachment is recently introduced into the eyeglasses industry, such as U.S. Pat. Nos. 5,416,537, 5,568,207, 5,642,177, 5,786,880, and 5,975,691, wherein a primary pair of magnet members is affixed on two side extensions of a primary spectacle frame respectively. A shelter frame, such as a sunglasses, includes a pair of arms for resting over the upper side extensions for preventing the shelter frame from moving downward relative to the primary spectacle for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Moreover, the magnet members are firmly affixed to the spectacle frame of the primary spectacle. Once the spectacle frame is accidentally bent its shape, the shelter frame may not precisely mounted on the primary spectacle by means of the magnet attachment. Furthermore, the spectacle frame of the primary spectacle must be altered to fit the magnet members thereto such that the magnet members will destroy the aesthetic appearance of the primary spectacle.

In U.S. patents such as U.S. Pat. Nos. 5,737,054, 6,012,811, 6,092,896, 6,109,747, and 6,367,926, modification of the above magnetic clip-on sunglasses have been introduced by positioning the magnetic members from the side extensions to the bridges of the spectacle frame, wherein one or more magnetic members mounted on a bridge of the primary frame for magnetically coupling one or more corresponding magnetic members mounted on the bridge of the shelter frame respectively. Such alternative design of magnetic frames also contains the following shortcomings remained unsolved. Since the bridge of the shelter frame just sits on the bridge of the primary frame, when the shelter frame is attached to the primary frame, the overall size of the bridge is double that greatly affect the appearance of the sunglasses set. Also, the present of the magnet members at the bridges of the primary and shelter frames greatly limits the bridge design and variation thereof.

In addition, the shelter frame is attached to the primary frame by merely sitting the bridge of the shelter frame on the bridge of the primary frame that is an unbalance and unsteady attachment. In other words, the only coupling ability existed between the shelter frame and the primary frame is the magnetic attraction of the two magnetic members on the two bridges. Therefore, the shelter frame can be detached from the primary frame frontwardly and upwardly. In other words, when there is a stretching force applied between the two temples or the two side extensions, the bridge of the primary frame will be pushed inwardly that may cause the primary frame detaching from the shelter frame. Also, when the wearer is doing exercise such as jumping with such magnetic frame, the shelter frame may easily bound up and detach from the primary frame accidentally. Generally speaking, such modified magnetic clip-on sunglasses set fails to provide a locking construction and a secure connection between the shelter frame and the primary frame.

SUMMARY OF THE PRESENT INVENTION

A main object of the present invention is to provide a spectacles set which comprises a detachable shelter frame adapted for precisely and easily attaching in front of a primary spectacle frame by means of a magnetic attaching arrangement so as to securely mount on the primary spectacle frame without the risk of scratching the lenses of the primary spectacle frame.

Another object of the present invention is to provide a spectacle set which further provides a locking construction between the shelter frame and the primary frame so as to ensure a secure magnetic connection.

Another object of the present invention is to provide a spectacle set wherein the bridge of shelter frame is extended and positioned behind the bridge of the primary frame to not only provide an interlocking construction but also will not affect the shape and size design of the bridge of the primary frame.

Another object of the present invention is to provide a spectacles set, wherein the magnet engaging arrangement is hidden behind the primary spectacle frame at the nose supports thereof so as to keep the aesthetic appearance of the primary spectacle frame and avoid the shelter frame from detaching frontwardly.

Another object of the present invention is to provide a spectacles set, wherein the nose supports are adapted to be adjusted their positions with respect to the primary spectacle frame in order to fit the wearer, the wearer may still self-adjust the magnet engaging arrangement to align with the detachable shelter frame even the shape of the primary spectacle frame is slightly distorted.

Another object of the present invention is to provide a spectacles set, wherein two supporting arms of the magnetic attaching arrangement are securely mounted on a primary bridge of the primary spectacle, so as to prevent up and down movement or sideward movement of the detachable shelter frame with respect to the primary spectacle frame.

Another object of the present invention is to provide a spectacles set, wherein the wearer may merely use one hand to attach or detach the detachable shelter frame during exercising or driving.

Another object of the present invention is to provide a spectacles set, which does not require to change the original structural design of the primary spectacle frame.

Another object of the present invention is to provide a spectacles set with detachable shelter frame, wherein no magnet is needed to embed into the primary spectacle frame such that no magnetic field is generated around the primary spectacle frame to affect the wearer's health while he or she normally wears the primary spectacle frame.

Accordingly, in order to accomplish the above objects, the present invention provides a spectacles set comprising a primary spectacle frame and a detachable shelter frame adapted for mounting in front of the primary spectacle frame.

The primary spectacle frame comprises a frame body which comprises a pair of lenses and a primary bridge having two ends connected to two inner sides of the lenses respectively, two nose support units rearwardly extended from the frame body, two magnetic holders each of which has magnetic attraction ability being provided at the two nose support units respectively, and two side extensions provided at two outer sides of the lenses for coupling a pair of temples respectively.

The detachable shelter frame comprises a shelter frame for supporting two auxiliary lenses and a pair of magnetic attaching arrangements connected to the shelter frame wherein each of the magnetic attaching arrangements comprises a supporting arm extending rearwardly from an inner side of the auxiliary lens of the shelter frame towards the respective magnetic holder and a magnetic seat which is connected to the supporting arm and extended to magnetically attach the respective magnetic holder of the primary spectacle frame so as to hold the shelter frame in front of the primary spectacle frame in position.

These and other objectives, features, and advantages of the present invention will become apparent from the following detailed description, the accompanying drawings, and the appended claims.

DETAILED DESCRIPTION OF THE PREFERRED EMBODIMENT

Figure 1:
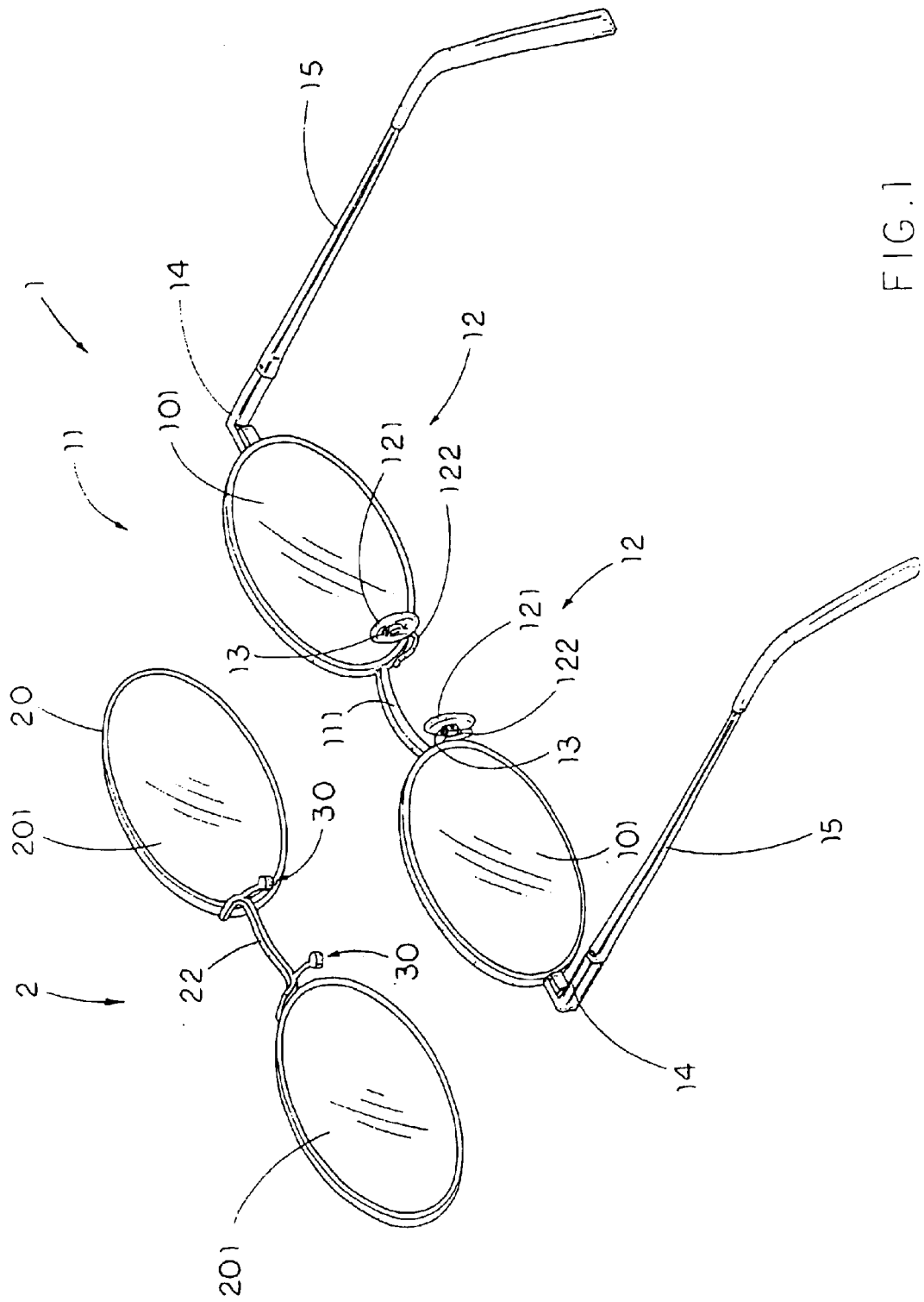
FIG. 1 is a perspective view of a spectacles set according to a first preferred embodiment of the present invention.

Referring to FIG. 1 of the drawings, a spectacles set according to a first preferred embodiment of the present invention is illustrated, wherein the spectacles set comprises a primary spectacle frame 1 and a detachable shelter frame 2 adapted for detachably mounting in front of the primary spectacle frame 1.

The primary spectacle frame 1 comprises a frame body 11 which comprises a pair of lenses 101 and a primary bridge 111 having two ends connected to two inner sides of the lenses 101 respectively, two nose support units 12 rearwardly extended from the frame body 11, two magnetic holders 13 each of which has magnetic attraction ability being provided at the two nose support units 12 respectively, and two side extensions 14 provided at two outer sides of the lenses 101 for coupling a pair of temples 15 respectively.

The detachable shelter frame 2 comprises a shelter frame 20 for supporting two auxiliary lenses 201 and a pair of magnetic attaching arrangements 30 connected to the shelter frame 20 wherein each of the magnetic attaching arrangements 30 comprises a supporting arm 31 extending rearwardly from an inner side of the auxiliary lens 201 of the shelter frame 20 towards the respective magnetic holder 13 and a magnetic seat 32 which is connected to the supporting arm 31 and extended to magnetically attach the respective magnetic holder 13 of the primary spectacle frame 1 so as to hold the shelter frame 20 in front of the primary spectacle frame 1 in position.

The frame body 11 of the primary spectacle frame 1 can be constructed as the conventional spectacle frame to have a pair of lens rims, as shown in FIG. 1, or the rimless frame that the primary bridge 111 and two side extensions 14 are directly fastened to the edges of the two lenses 101.

Figure 2:
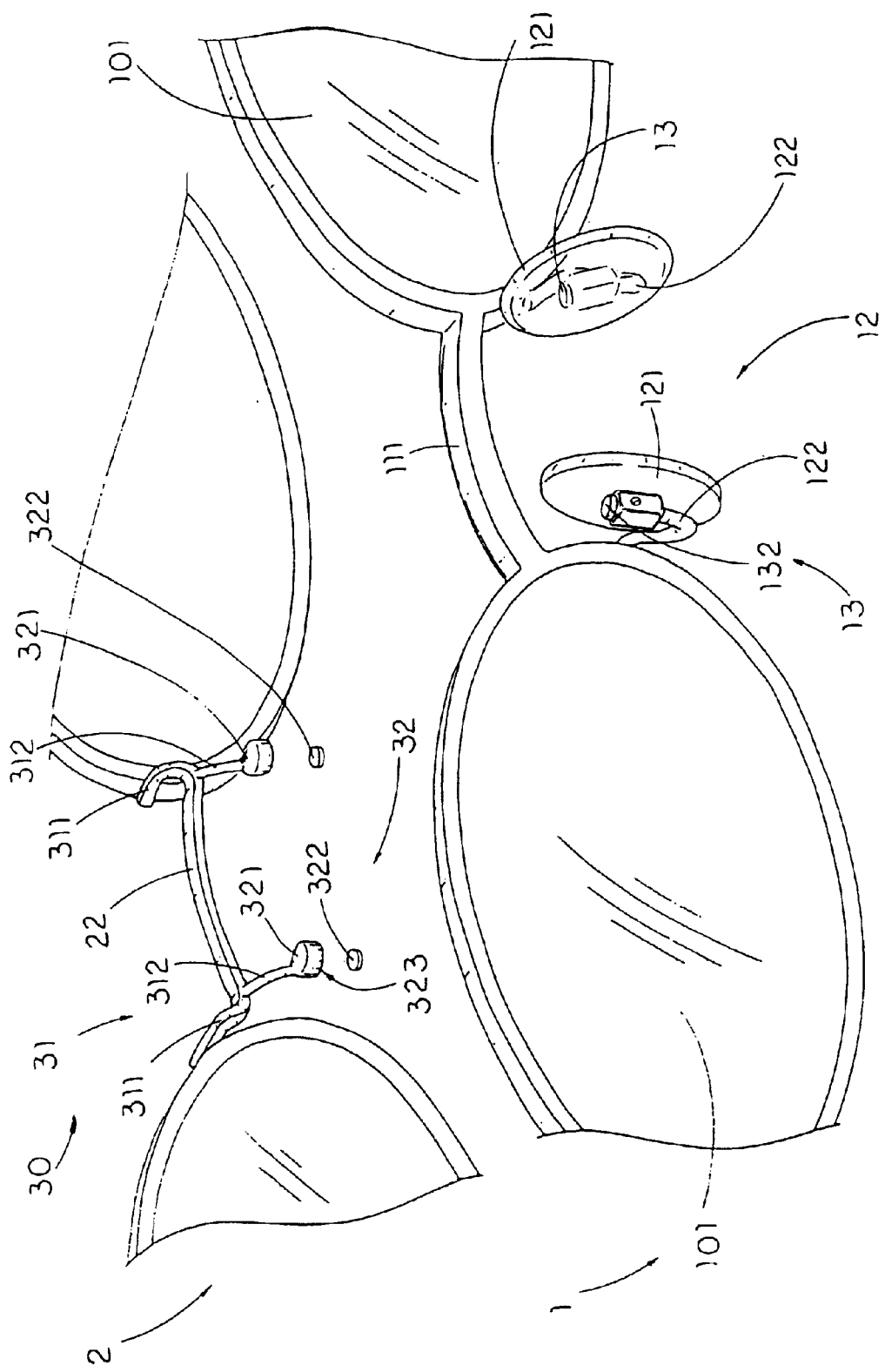
FIG. 2 is a partially perspective view of a spectacles set according to the above first preferred embodiment of the present invention.

As shown in FIG. 2, each of the nose support units 12 comprises a nose pad 121 and a nose support 122 having a first end rearwardly extended from the inner side of the lenses 101 of the frame body 11 and a second end coupling with the respective nose pad 121, wherein the two magnetic holders 13 are upwardly extended from the second ends of the nose supports 122 respectively. Each of the magnetic holders 13 is made of a kind of metal having magnetic attraction ability such as mild steel, low carbon steel and high grade steel, which is attractive to magnetic material such as permanent magnet.

According to the preferred embodiment, each of the supporting arms 31 comprises a riding body 311 rearwardly extended from the frame body 11 to ride on the primary bridge 111 and a mounting body 312 downwardly and integrally extended from a rear end of the riding body 311 towards the respective magnetic holder 13 wherein the magnetic seat 32 is extended from a rear end of the riding body 311 to magnetically attach to the magnetic holder 13.

Each of the magnetic seats 32 comprises a magnetic housing 321 downwardly and rearwardly extended from the respective supporting arm 31 and a magnet 322 which is mounted in the magnetic housing 321 and arranged to face toward and align with the respective magnetic holder 13 when the detachable shelter frame 2 is mounted in front of the primary spectacle frame 1.

Figure 3:
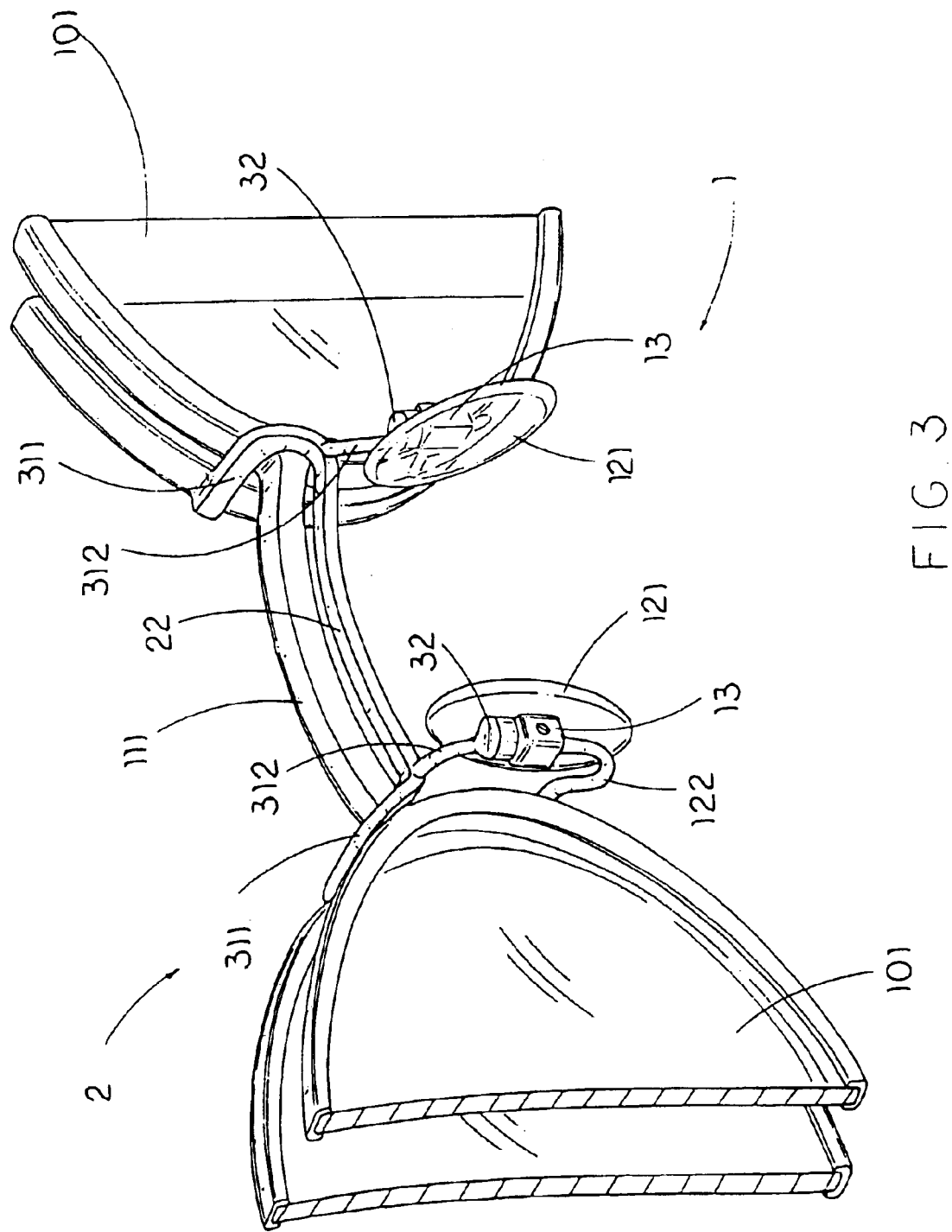
FIG. 3 is a partially perspective view of the spectacles set according to the above first preferred embodiment of the present invention, illustrating the detachable shelter frame being mounted in front of the primary spectacle frame.

The shelter frame 20 further comprises an extension arm 22, which substantially functions as the bridge of the shelter frame 20, integrally extended between the two supporting arms 31 and arranged in such a manner that when the supporting arms 31 are ride on the primary bridge 111, the extension arm 22 is extended to mount behind the primary bridge 111 to lockup the detachable shelter frame 2 mounted in front of the primary spectacle frame 1, so as to further prevent any frontward movement of the detachable shelter frame 2 with respect to the primary spectacle frame 1, as shown in FIG. 3. In other words, since the extension arm 22 can be hided behind the bridge 111 of the primary spectacle frame 1, the thickness of the bridge 111 of the primary spectacle frame 1 remains the same when the shelter frame 20 is attached in front of the primary spectacle frame 1. In addition, it will not limit the shape and size design of the bridge of the primary spectacle because there is no magnet members provided on the bridge 111.

Moreover, each of the magnetic holders 13 has an engaging member 132 protruding integrally and upwardly wherein each of the engaging members 132 is made of soft magnetic metal which is attractive to magnetic material such as permanent magnet.

Each magnet 322 has a thickness smaller than a depth of the respective magnetic housing 321 so as to define an engaging groove 323, so that the magnet 322 is embedded in the magnetic housing 321 for fittedly engaging with the respective engaging member 132. In other words, the two engaging grooves 323 are formed the two magnetic seats 32 for fittedly engaging with the two engaging members 132 of the two magnetic holders 13 respectively, so as to further guide the two magnetic attaching arrangements to magnetically attach to the two magnetic holders 13 respectively.

It is obvious to modify the engagement that the engaging grooves 323 can be formed on the magnetic holders 13 wherein each magnet 322 has a thickness larger than the depth of the respective magnetic housing 321 so as to define the engaging member 132 on the respective magnetic seat 32, in such a manner that the engaging members 132 of the magnetic seats 32 are fittedly engaged with the engaging grooves 323 of the magnetic holders 13 when the detachable shelter frame 2 is mounted in front of the primary spectacle frame 1.

In order to mount the detachable shelter frame 2 in front of the primary spectacle frame 1, the user may simply use one hand to put the shelter frame 20 in front of the frame body 11 and drop it down. The supporting arms 31 are securely clipped on the primary bridge 111 so as to securely interlock the shelter frame 20 with the frame body 11. Moreover, due to the magnetic attraction, the two magnetic seats 32 of the shelter frame 21 are magnetically attracted to the magnetic holders 13 of the frame body 11 respectively. The supporting arms 31 further guide the two magnetic seats 32 to automatically align with the two magnetic holders 13 respectively while the extension arm 22 is mounted behind the primary bridge 111 in such a manner that the two magnetic seats 32 are magnetically engaged with the magnetic holders 13 respectively, so as to hold the shelter frame 20 on the frame body 11 in position. So, the present invention provides not only the magnetic attraction but also the interlocking engagement for securely mounting the detachable shelter frame 2 in front of the primary spectacle frame 1, as shown in FIG. 3.

The user can also detach the shelter frame 20 of the detachable shelter frame 2 from the frame body 11 of the primary spectacle frame 1 easily by slightly pulling the shelter frame 2 away from the primary spectacle frame 1 until the two magnetic seats 32 move apart from the two magnetic holders 13 respectively, so as to release the magnetic engagement between the detachable shelter frame 2 and the primary spectacle frame 1. Then, at the same time, the user may detach the shelter frame 20 by simply lifting it up from the primary spectacle frame 1 with one hand, so as to detach the supporting arms 31 to from the primary bridge 111 of the frame body 11. In other words, the user may merely use one hand to attach or detach the detachable shelter frame 2 from the primary spectacle frame 1 especially when the user is exercising or driving that it is dangerous for him or her to user both hands to wear the detachable shelter frame 2.

Figure 4:
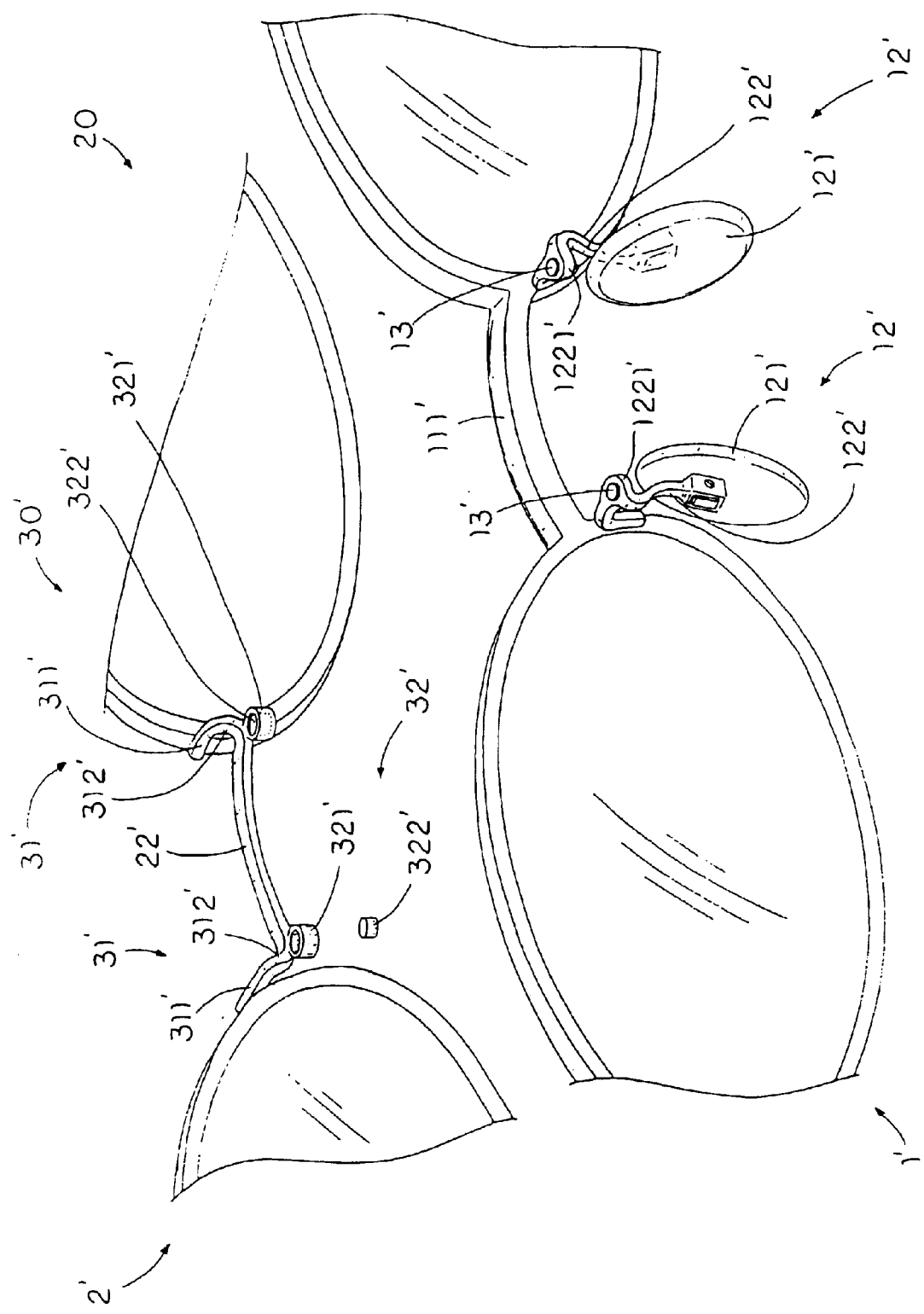
FIG. 4 illustrates an alternative mode of the magnetic attaching arrangement of the spectacles set according to the above first preferred embodiment of the present invention.

FIG. 4 illustrates an alternative mode of the magnetic attaching arrangement 30' of the spectacles set according to the preferred embodiment of the present invention, wherein each of the nose support units 12' comprises a nose pad 121' and a nose support 122' which has a distal end portion coupled with the nose pad 121' and a root end portion extended from the frame body 11'. The root end portion of each of the nose supports 122' is shaped as a holder housing 1221' wherein the magnetic holders 13' are received in the holder housings 1221' of the nose supports 122' respectively. In other words, the two magnetic holders 13' are provided on top of the nose support units 12' respectively.

Correspondingly, each of the supporting arms 31' comprises a riding body 311' rearwardly extended from the frame body 11' to ride on the primary bridge 111' and a mounting body 312' downwardly and integrally extended from a rear end of the riding body 311' towards the respective magnetic holder 13' wherein the magnetic seat 32' is extended from a rear end of the riding body 311' to magnetically attach to the magnetic holder 13'.

Each of the magnetic seats 32' comprises a magnetic housing 321' downwardly and rearwardly extended from the respective supporting arm 31' and a magnet 322' which is mounted in the magnetic housing 321' and arranged to face toward and align with the respective magnetic holder 13' when the detachable shelter frame 2' is mounted in front of the primary spectacle frame 1'. It is worth to mention that the mounting bodies 312' can be substantially reduced the lengths to connect the magnetic seats 32' because the magnetic holders 13' are positioned on top of the nose support units 12' respectively.

Accordingly, each of the magnetic holders 13' has a top portion upwardly protruding from the respective holder housings 1221' of the nose supports 122' to form an engaging member, wherein each of the engaging members 132' is made of soft magnetic metal which is attractive to magnetic material such as permanent magnet.

Each magnet 322' has a thickness smaller than a depth of the respective magnetic housing 321' so as to define an engaging groove, so that the magnet 322' is embedded in the magnetic housing 321' for fittedly engaging with the respective engaging member of the magnetic holder 13'. In other words, the two engaging grooves is are formed the two magnetic seats 32' for fittedly engaging with the two engaging members of the two magnetic holders 13' respectively, so as to further guide the two magnetic attaching arrangements 30' to magnetically attach to the two magnetic holders 13' respectively.

The shelter frame 20' further comprises an extension arm 22' integrally extended between the two supporting arms 31' and arranged in such a manner that when the supporting arms 31' are ride on the primary bridge 111', the extension arm 22' is mounted behind the primary bridge 111' to lock up the detachable shelter frame 2' is mounted in front of the primary spectacle frame 1'.

Figure 5:
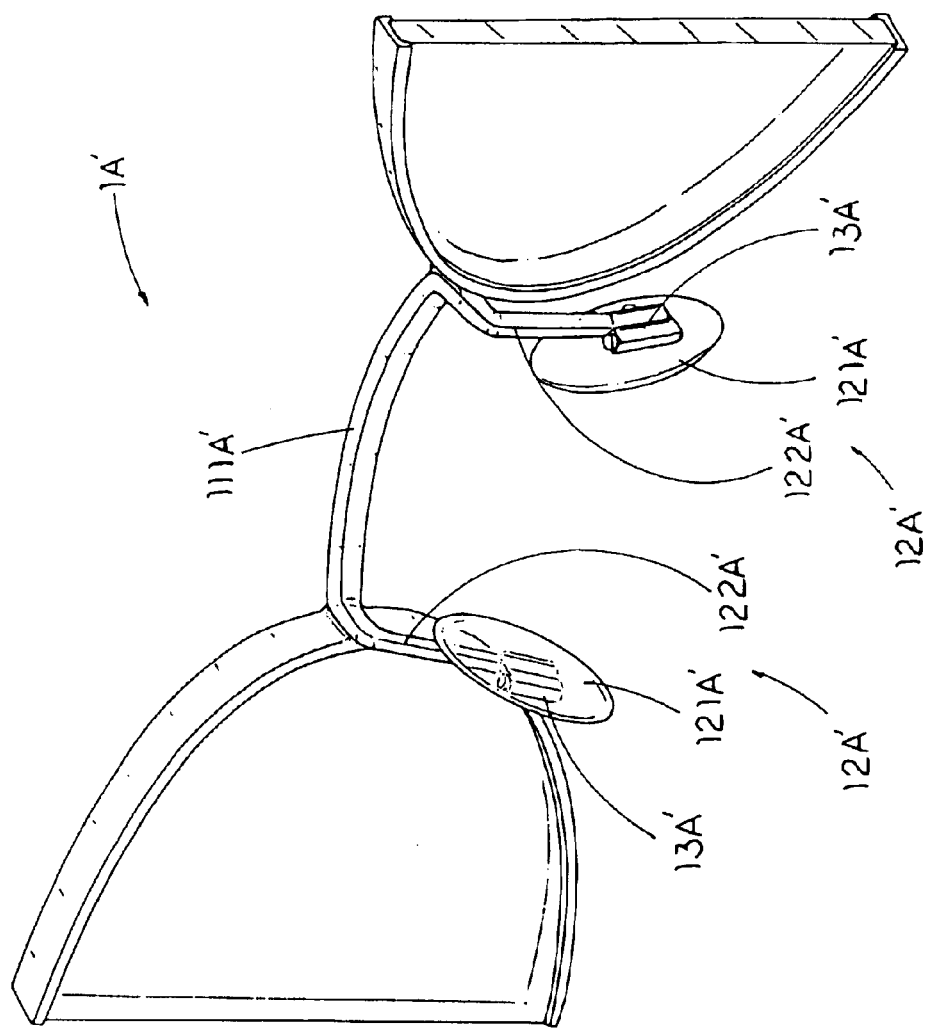
FIG. 5 is a first alternative mode of the nose support unit of the spectacles set according to the above first preferred embodiment of the present invention.

FIG. 5 illustrates a first embodiment of the nose support unit 12A' of the spectacles set of the present invention, wherein the nose support units 12A' each of which comprises a nose pad 121A' and a nose support 122A' having a first end integrally extended from the respective end of the primary bridge 111A' of the primary spectacle frame 1A' and a second end coupling with the nose pad 121A', wherein the magnetic holders 13A' are upwardly provided at the second ends of the nose supports 122A' respectively. In other words, the two first ends of the nose supports 122A' are integrally extended from two end portions of the primary bridge 111A' so as to form a one-piece integral member.

Figure 6:
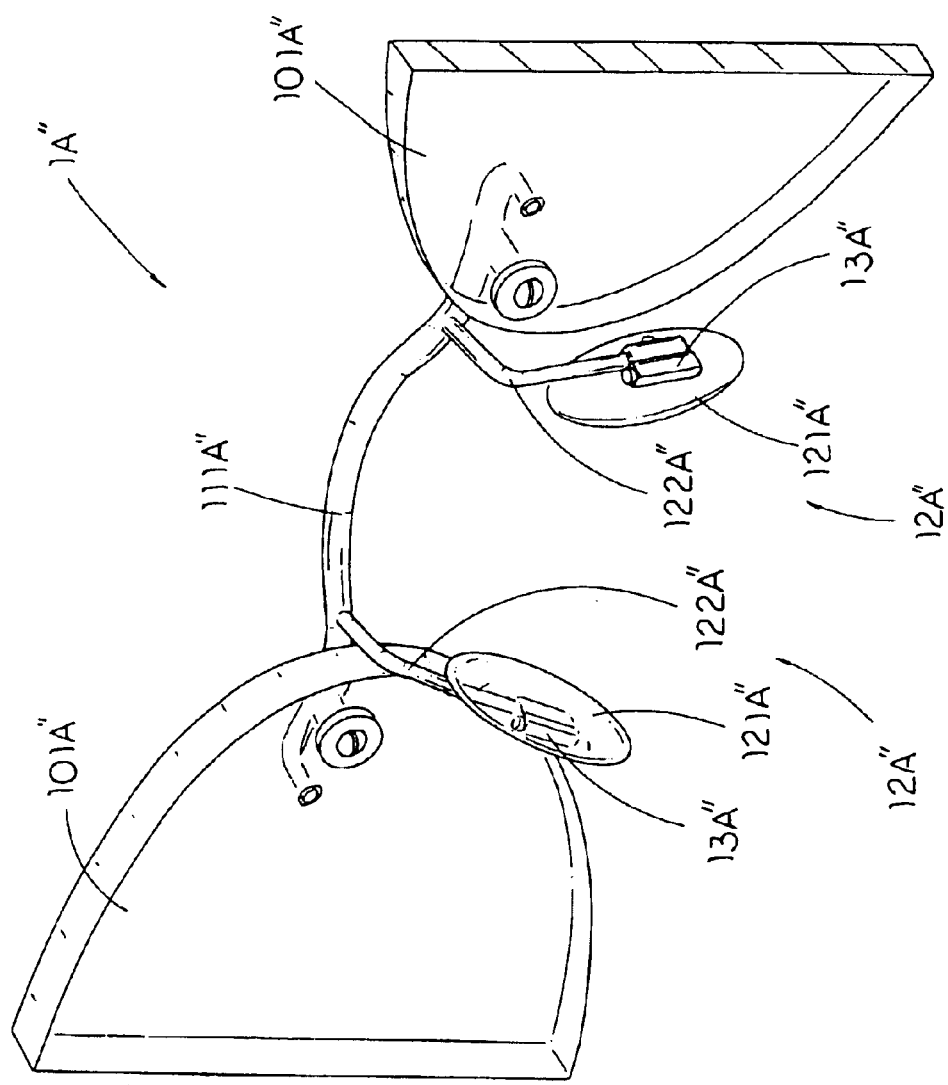
FIG. 6 illustrates a second alternative mode of the nose support unit of the spectacles set according to the above first preferred embodiment of the present invention.

FIG. 6 illustrates a second alternative mode of the nose support units 12A" each of which comprises a nose pad. 121A" and a nose support 122A" having a first end integrally extended from the primary bridge 111A" of the primary spectacle frame 1A" and a second end coupling with the nose pad 121A", wherein the magnetic holders 13A" are provided at the second ends of the nose supports 122A" respectively.

Accordingly, the two ends of the primary bridge 111A" are directly fastened to the two lenses 101A" respectively wherein the nose supports 121A" are integrally and rearwardly extended from the primary bridge 111A" so as to form a one-piece integral member. In other words, the primary spectacle frame 1A" is constructed as the rimless spectacle frame.

Figure 7:
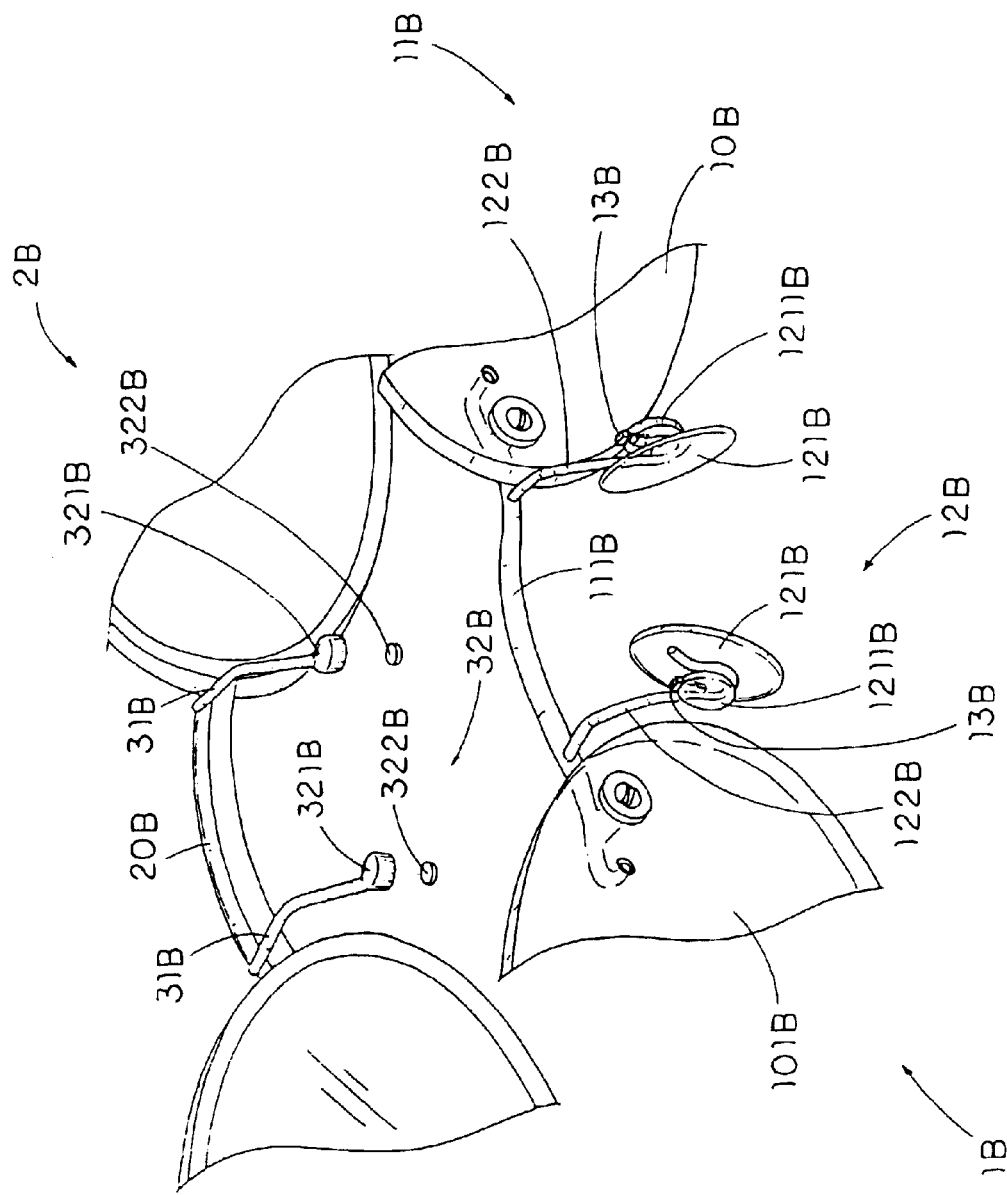
FIG. 7 is a partially perspective view of a spectacles set according to a second preferred embodiment of the present invention.

As shown in FIG. 7, a spectacles set according to a second embodiment illustrates an alternative mode of the first embodiment of the present invention, wherein each of the nose support units 12B comprises a nose pad 121B having a mounting element 1211B protruding sidewardly, and a nose support 122B having a first end rearwardly extended from the inner side of the lenses 101B and a second end having a loop shaped attached to the mounting element 1211B of the respective nose pad 121B.

The two first ends of the nose supports 122B are integrally and rearwardly extended from the primary bridge 111B of the frame body 11B wherein two end portions of the primary bridge 111B are directly fastened with two lenses 101B respectively to form a rimless spectacle frame.

The magnetic holders 13B are upwardly extended from the mounting elements 1211B of the nose pads 121B respectively wherein each of the magnetic holders 13B is made of a kind of metal having magnetic attraction ability such as mild steel, low carbon steel and high grade steel, which is attractive to magnetic material such as permanent magnet. Accordingly, each of the magnetic holders 13B is firmly embedded on an upper side of the respective mounting element 1211B of the respective nose pad 121B, as shown in FIG. 7, in such a manner that the primary spectacle frame 1B does not require to alter its original structure in order to incorporate with the shelter frame 20B by means of magnetic engagement.

The magnetic attaching arrangements 30B are constructed as the magnetic attaching arrangements 30 as shown in FIG. 2. Each of the magnetic attaching arrangements 30B comprises a supporting arm 31B extending rearwardly from the inner side of the shelter frame 20B towards the respective magnetic holder 13B for riding on the primary bridge 111B so as to securely mount the shelter frame 20B in front of the primary spectacle frame 1B and a magnetic seat 32B which is connected to the supporting arm 31B and extended to magnetically attach the respective magnetic holder 13B of the primary spectacle frame 1B so as to hold the shelter frame 20B in front of the primary spectacle frame 1B in position.

Each of the magnetic seats 32B comprises a magnetic housing 321B rearwardly extended from the respective supporting arm 31B wherein each magnetic seat 32B is made of non-magnetic material or soft-magnetic metal having magnetic attraction ability such as mild steel, low carbon steel and high grade steel and a magnet 322B mounted in the magnetic housing 321B, which is arranged to face toward and align with the respective magnetic holder 13B of the shelter frame 20B when the detachable shelter frame 2B is mounted in front of the primary spectacle frame 1B.

Accordingly, each of the magnetic holders 13B is upwardly protruding from the respective mounting element 1211B of the nose pad 121B to form an engaging member, wherein each magnet 322B has a thickness smaller than a depth of the respective magnetic housing 321B to define an engaging groove, in such a manner that the engaging members of the magnetic holders 13B are fittedly engaged with the engaging grooves of the magnetic seats 32B respectively when the detachable shelter frame 2B is mounted in front of the primary spectacle frame 1B.

It is obvious that the detachable shelter frame 2B is constructed as shown in FIG. 2 that the extension arm 22 of the shelter frame 20 is integrally extended between the two supporting arms 31 and arranged in such a manner that when the supporting arms 31 are ride on the primary bridge 111B, the extension arm 22 is mounted behind the primary bridge 111B to lock up the detachable shelter frame 2B is mounted in front of the primary spectacle frame 1.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A spectacles set, comprising a primary spectacle frame and a detachable shelter frame constructed for mounting in front of said primary spectacle frame;

said primary spectacle frame comprising a frame body which comprises a pair of lenses and a primary bridge having two ends connected to two inner sides of said lenses respectively, two nose support units rearwardly extended from said frame body, two magnetic holders, each of which has a magnetic attraction ability, provided at said two nose support units respectively, and two side extensions provided at two outer sides of said lenses for coupling a pair of temples respectively;

said detachable shelter frame comprising a shelter frame for supporting two auxiliary lenses and a pair of magnetic attaching arrangements connected to said shelter frame wherein each of said magnetic attaching arrangements comprises a supporting arm extending rearwardly from an inner side of said auxiliary lens of said shelter frame towards said respective magnetic holder and a magnetic seat which is connected to said supporting arm and extended to magnetically attach said respective magnetic holder of said primary spectacle frame so as to hold said shelter frame in front of said primary spectacle frame in position.

2. The spectacles set, as recited in claim 1, wherein each of said nose support units comprises a nose pad and a nose support having a first end rearwardly extended from said inner side of said respective lens and a second end coupled with said nose pad, wherein said magnetic holders are upwardly extended from said second ends of said nose supports respectively.

3. The spectacles set, as recited in claim 2, wherein said first ends of said nose support are integrally and rearwardly extended from said two ends of said primary bridge respectively.

4. The spectacles set, as recited in claim 3, wherein said two ends of said primary bridge are directly fastened to said two lenses respectively so as to form said primary spectacle frame as a rimless spectacle frame.

5. The spectacles set, as recited in claim 4, wherein each of said magnetic seats comprises a magnetic housing downwardly and suspendedly extended from a rear end of said respective supporting arm and a magnet mounted in said magnetic housing, wherein each magnetic seat is made of non-magnetic material and is arranged to face toward and align with said respective magnetic holder of said shelter frame when said detachable shelter frame is mounted in front of said primary spectacle frame.

6. The spectacles set, as recited in claim 5, wherein said shelter frame further comprises an extension arm having two ends extended between said two supporting arms and arranged in such a manner that when said supporting arms are ride on said primary bridge, said extension arm is mounted behind said primary bridge to securely retain said detachable shelter frame in front of said primary spectacle frame.

7. The spectacles set, as recited in claim 6, wherein each of said supporting arm comprises a riding body rearwardly extended from said inner side of said respective auxiliary lens to ride over said primary bridge of said frame body and a mounting body downwardly extended from said riding body towards said magnetic holder when said detachable shelter frame is mounted in front of said primary spectacle frame.

8. The spectacles set, as recited in claim 3, wherein each of said magnetic seats comprises a magnetic housing downwardly and suspendedly extended from a rear end of said respective supporting arm and a magnet mounted in said magnetic housing, wherein each magnetic seat is made of non-magnetic material and is arranged to face toward and align with said respective magnetic holder of said shelter frame when said detachable shelter frame is mounted in front of said primary spectacle frame.

9. The spectacles set, as recited in claim 8, wherein said shelter frame further comprises an extension arm having two ends extended between said two supporting arms and arranged in such a manner that when said supporting arms are ride on said primary bridge, said extension arm is mounted behind said primary bridge to securely retain said detachable shelter frame in front of said primary spectacle frame.

10. The spectacles set, as recited in claim 9, wherein each of said supporting arm comprises a riding body rearwardly extended from said inner side of said respective auxiliary lens to ride over said primary bridge of said frame body and a mounting body downwardly extended from said riding body towards said magnetic holder when said detachable shelter frame is mounted in front of said primary spectacle frame.

11. The spectacles set, as recited in claim 2, wherein each of said magnetic seats comprises a magnetic housing downwardly and suspendedly extended from a rear end of said respective supporting arm and a magnet mounted in said magnetic housing, wherein each magnetic seat is made of non-magnetic material and is arranged to face toward and align with said respective magnetic holder of said shelter frame when said detachable shelter frame is mounted in front of said primary spectacle frame.

12. The spectacles set, as recited in claim 11, wherein said shelter frame further comprises an extension arm having two ends extended between said two supporting arms and arranged in such a manner that when said supporting arms are ride on said primary bridge, said extension arm is mounted behind said primary bridge to securely retain said detachable shelter frame in front of said primary spectacle frame.

13. The spectacles set, as recited in claim 12, wherein each of said supporting arm comprises a riding body rearwardly extended from said inner side of said respective auxiliary lens to ride over said primary bridge of said frame body and a mounting body downwardly extended from said riding body towards said magnetic holder when said detachable shelter frame is mounted in front of said primary spectacle frame.

14. The spectacles set, as recited in claim 1, wherein each of said nose support units comprises a nose pad and a nose support having a distal end portion coupled with said nose pad and a root end portion which is extended from said frame body and is shaped as a holder housing, wherein said magnetic holders are received in said holder housings of said nose supports respectively.

15. The spectacles set, as recited in claim 14, wherein each of said magnetic seats comprises a magnetic housing downwardly and suspendedly extended from a rear end of said respective supporting arm and a magnet mounted in said magnetic housing, wherein each magnetic seat is made of non-magnetic material and is arranged to face toward and align with said respective magnetic holder of said shelter frame when said detachable shelter frame is mounted in front of said primary spectacle frame.

16. The spectacles set, as recited in claim 15, wherein each of said magnetic holders has a top portion upwardly protruding from said respective holder housings of said nose supports to form an engaging member, wherein each said magnet has a thickness smaller than a depth of said respective magnetic housing to define an engaging groove, in such a manner that said engaging members of the magnetic holders are fittedly engaged with said engaging grooves of said magnetic seats respectively when said detachable shelter frame is mounted in front of said primary spectacle frame.

17. The spectacles set, as recited in claim 15, wherein said shelter frame further comprises an extension arm having two ends extended between said two supporting arms and arranged in such a manner that when said supporting arms are ride on said primary bridge, said extension arm is mounted behind said primary bridge to securely retain said detachable shelter frame in front of said primary spectacle frame.

18. The spectacles set, as recited in claim 17, wherein each of said supporting arm comprises a riding body rearwardly extended from said frame body to ride over said primary bridge of said frame body and a mounting body downwardly and integrally extended from a rear end of said riding body towards said magnetic holder when said detachable shelter frame is mounted in front of said primary spectacle frame.

19. The spectacles set, as recited in claim 15, wherein each of said supporting arm comprises a riding body rearwardly extended from said frame body to ride over said primary bridge of said frame body and a mounting body downwardly and integrally extended from a rear end of said riding body towards said magnetic holder when said detachable shelter frame is mounted in front of said primary spectacle frame.

20. The spectacles set, as recited in claim 14, wherein said shelter frame further comprises an extension arm having two ends extended between said two supporting arms and arranged in such a manner that when said supporting arms are ride on said primary bridge, said extension arm is mounted behind said primary bridge to securely retain said detachable shelter frame in front of said primary spectacle frame.

21. The spectacles set, as recited in claim 1, wherein each of said nose support units comprises a nose pad having a mounting element protruding sidewardly, and a nose support having a first end rearwardly extended from said inner side of said respective lens and a second end having a loop shaped attached to said mounting element of said nose pad, wherein said magnetic holders are provided on upper sides of said mounting elements of said nose pads respectively.

22. The spectacles set, as recited in claim 21, wherein each of said magnetic seats comprises a magnetic housing downwardly and suspendedly extended from a rear end of said respective supporting arm and a magnet mounted in said magnetic housing, wherein each magnetic seat is made of non-magnetic material and is arranged to face toward and align with said respective magnetic holder of said shelter frame when said detachable shelter frame is mounted in front of said primary spectacle frame.

23. The spectacles set, as recited in claim 22, wherein each of said magnetic holders is upwardly protruding from said respective mounting element of said nose pad to form an engaging member, wherein each said magnet has a thickness smaller than a depth of said respective magnetic housing to define an engaging groove, in such a manner that said engaging members of the magnetic holders are fittedly engaged with said engaging grooves of said magnetic seats respectively when said detachable shelter frame is mounted in front of said primary spectacle frame.

24. The spectacles set, as recited in claim 23, wherein said shelter frame further comprises an extension arm having two ends extended between said two supporting arms and arranged in such a manner that when said supporting arms are ride on said primary bridge, said extension arm is mounted behind said primary bridge to securely retain said detachable shelter frame in front of said primary spectacle frame.

25. The spectacles set, as recited in claim 24, wherein each of said supporting arm comprises a riding body rearwardly extended from said frame body to ride over said primary bridge of said frame body and a mounting body downwardly and integrally extended from a rear end of said riding body towards said magnetic holder when said detachable shelter frame is mounted in front of said primary spectacle frame.

26. The spectacles set, as recited in claim 23, wherein each of said supporting arm comprises a riding body rearwardly extended from said frame body to ride over said primary bridge of said frame body and a mounting body downwardly and integrally extended from a rear end of said riding body towards said magnetic holder when said detachable shelter frame is mounted in front of said primary spectacle frame.

27. The spectacles set, as recited in claim 22, wherein said shelter frame further comprises an extension arm having two ends extended between said two supporting arms and arranged in such a manner that when said supporting arms are ride on said primary bridge, said extension arm is mounted behind said primary bridge to securely retain said detachable shelter frame in front of said primary spectacle frame.

28. The spectacles set, as recited in claim 22, wherein each of said supporting arm comprises a riding body rearwardly extended from said frame body to ride over said primary bridge of said frame body and a mounting body downwardly and integrally extended from a rear end of said riding body towards said magnetic holder when said detachable shelter frame is mounted in front of said primary spectacle frame.

* * * * *